(12) United States Patent
Dismuke, Sr.

(10) Patent No.: US 9,487,362 B2
(45) Date of Patent: Nov. 8, 2016

(54) AUGER PAN/HOPPER SPLASH SHIELD AND SAFETY GUARD

(71) Applicant: Keith T. Dismuke, Sr., Harrisburg, IL (US)

(72) Inventor: Keith T. Dismuke, Sr., Harrisburg, IL (US)

( * ) Notice: Subject to any disclaimer, the term of this patent is extended or adjusted under 35 U.S.C. 154(b) by 0 days.

(21) Appl. No.: 14/294,361

(22) Filed: Jun. 3, 2014

(65) Prior Publication Data
US 2015/0344226 A1 Dec. 3, 2015

(51) Int. Cl.
*B65G 33/00* (2006.01)
*B65G 69/18* (2006.01)
*B65G 33/24* (2006.01)

(52) U.S. Cl.
CPC ............. *B65G 69/181* (2013.01); *B65G 33/24* (2013.01)

(58) Field of Classification Search
CPC ...... B65G 33/08; B65G 47/20; B65G 41/00; B65G 51/30; B65G 51/32
USPC ........ 198/658, 671, 550.1; 193/22; 406/161, 406/164, 180; 56/16.6
See application file for complete search history.

(56) References Cited

U.S. PATENT DOCUMENTS

| | | | |
|---|---|---|---|
| 3,035,682 A * | 5/1962 | Ferch | 198/550.1 |
| 5,167,581 A * | 12/1992 | Haag | 460/114 |
| 5,465,829 A * | 11/1995 | Kruse | 198/538 |
| 6,296,435 B1 * | 10/2001 | Wood et al. | 414/523 |
| 7,552,817 B2 * | 6/2009 | Noble et al. | 198/671 |
| 7,644,816 B2 * | 1/2010 | Veiga Leal et al. | 198/671 |
| 7,971,702 B2 * | 7/2011 | Johnsgaard | 198/550.1 |
| 8,752,694 B2 * | 6/2014 | Putman | 198/671 |
| 9,038,814 B2 * | 5/2015 | Linde | 198/671 |

* cited by examiner

*Primary Examiner* — James R Bidwell
(74) *Attorney, Agent, or Firm* — Polster, Lieder, Woodruff & Lucchesi, L.C.

(57) ABSTRACT

A new and unique granular material-saving auger pan/hopper splash shield and safety guard is presented, being made of rigid, flexible, transparent or partially transparent material. The invention fits over the top of an auger pan/hopper, secured by a lower perimeter sleeve containing strap material and a locking or other securing device, and an upper perimeter sleeve containing elastic material and grommets where bungy cords (not part of the invention) can be hooked through and attached to the granular material source outlet. The auger pan/hopper splash shield and safety guard provides a containment shield to eliminate granular material spillage as well as preventing granular material loss due to moisture, outside contaminants, and damage. This invention may also be used as a safety device to prevent possible injury from the turning auger or conveyor belt and from flying granular materials.

5 Claims, 3 Drawing Sheets

AUGER PAN/HOPPER SPLASH SHIELD AND SAFETY GUARD

BACKGROUND OF THE INVENTION

Figure 1:
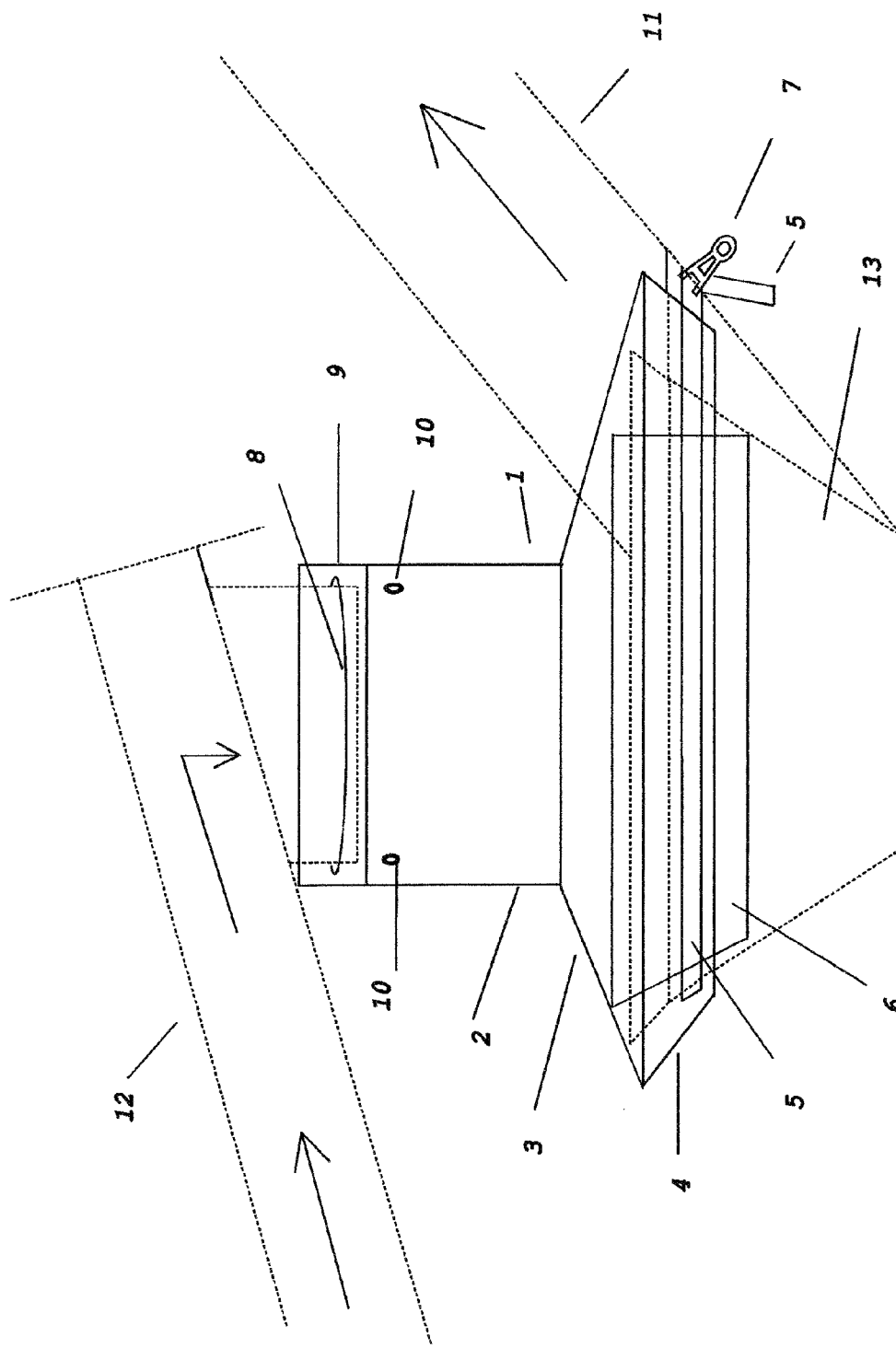

This invention relates primarily to loading and unloading granular materials from the silo or granular material storage bin to a transporting truck or other hauling vehicle or the reverse. This invention may also be used in the mining industry for similar purposes.

During the process of unloading granular material from harvesters, auger tubes of combine harvesters have a granular material-saving dam that guards against granular material spillage, a pivoting boot assembly patented by Viega Leal et al., U.S. Pat. No. 7,644,816 (2010). However, there is no dam or guard to prevent unwanted spillage of granular materials during subsequent granular material transfer, such as the granular material filling or emptying stage.

When granular material is being loaded or unloaded from the silo, it is not uncommon for granular materials to be knocked out of the auger pan/hopper by the turning auger or conveyor belt as granular material is being transferred to the granular material hauling truck or storage bin. This proves to be an expensive occurrence for loading and unloading operations during this stage, because farmers/companies must incur additional costs from having to go back and retrieve the spilled granular materials. In addition, granular material lying on the ground or in an uncovered auger pan/hopper is exposed to moisture from the elements as well as contamination from feeding rodents, animals and insects. The result is, of course, a potential loss in granular materials due to spoilage or damage.

Currently, there are no products available in the granular material hauling industry that serve to reduce or eliminate granular material spillage problems during the silo-to-truck transfer, or the reverse. Some farmers/companies attempt to reduce spillage by using readily available materials, such as panels to line the auger pan/hopper, or by spreading large drop cloths or tarps under the auger to catch the granular material after it has been thrown from the turning auger or conveyor belt. These makeshift solutions do not serve to reduce spillage enough to be cost-effective, nor do they prevent contamination, waste or damage.

The purpose for the auger pan/hopper splash shield and safety guard is to ensure the overall cost effectiveness during the loading and unloading process of granular materials by providing a containment shield. This containment shield prevents moisture damage to the granular materials, as well as keeps granular materials off the ground and away from outside contaminants, waste or damage. The containment shield feature of the invention is also a means of preventing possible injury from the turning auger or conveyor belt. The end result is that it can save farmers/companies granular materials and resources. The invention may also be useful in coal, rock, mineral and other natural resource mining and harvesting operations for the purpose of preventing granular materials from being knocked out of the auger pan/hopper by the turning auger or conveyor belt during transfer, thus leaving the work areas free from debris, and providing safety from flying granular materials.

BRIEF DESCRIPTION OF THE INVENTION

This invention consists of an auger pan/hopper splash shield and safety guard which is made of rigid, flexible, transparent, or partially transparent material. The material should be partially transparent because of the necessity of being able to monitor the movement of the granular material flow beneath the flare. The material should be flexible so that minor positioning adjustments (such as horizontal or vertical) can be made without having to detach or remove the invention. The material can vary in weight, and the invention may vary in size or shape to accommodate the different auger pans/hoppers and machines on which it is used.

The auger pan/hopper splash shield and safety guard sits over the top of the auger pan/hopper, secured by a length of strap (i.e.; rope, leather strap, or nylon webbing) and a locking device or other means of attachment, which in combination, act as a drawstring inside a lower perimeter sleeve.

Toward the center, there is a column with an upper perimeter sleeve that affixes to the granular material source outlet by flexible cords (i.e.; bungy cords), or by any other attaching methods, hooked through grommets. (Flexible, elastic cords, or other securing devices attaching through the grommets are not considered part of the invention.)

Along the inside edge of the lower perimeter sleeve is a curtain that hangs below the lower perimeter sleeve that acts as an overflow dam or curtain which lines the upper interior wall of the auger pan/hopper. The curtain prevents overflow by keeping granular material from slipping between the auger pan/hopper and the lower perimeter sleeve.

BRIEF DESCRIPTIONS OF THE DRAWINGS

FIG. 1. Is a side view of the auger pan/hopper splash shield and safety guard as it appears during use between the granular material source outlet and auger/hopper. (The directional arrows show the direction of the granular material flow.)

Figure 2:
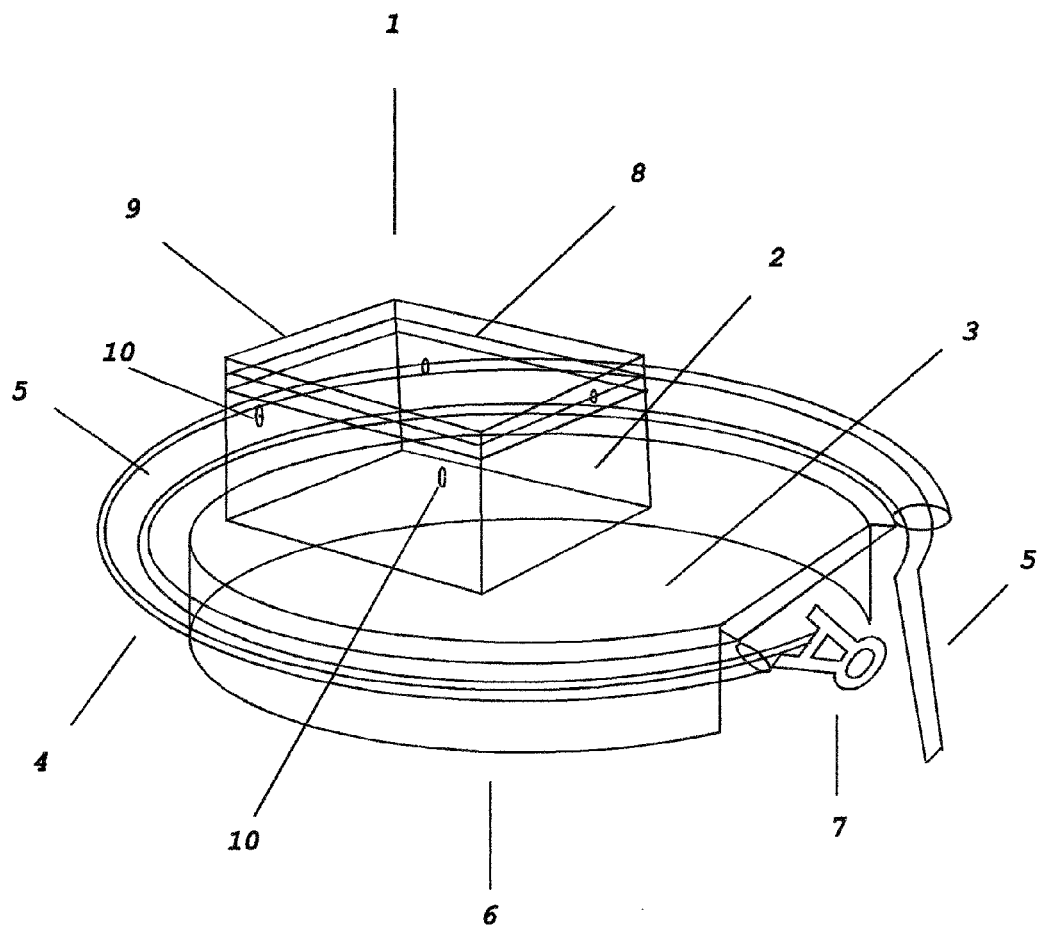

FIG. 2. Is a perspective view of the auger pan/hopper splash shield and safety guard.

Figure 3:
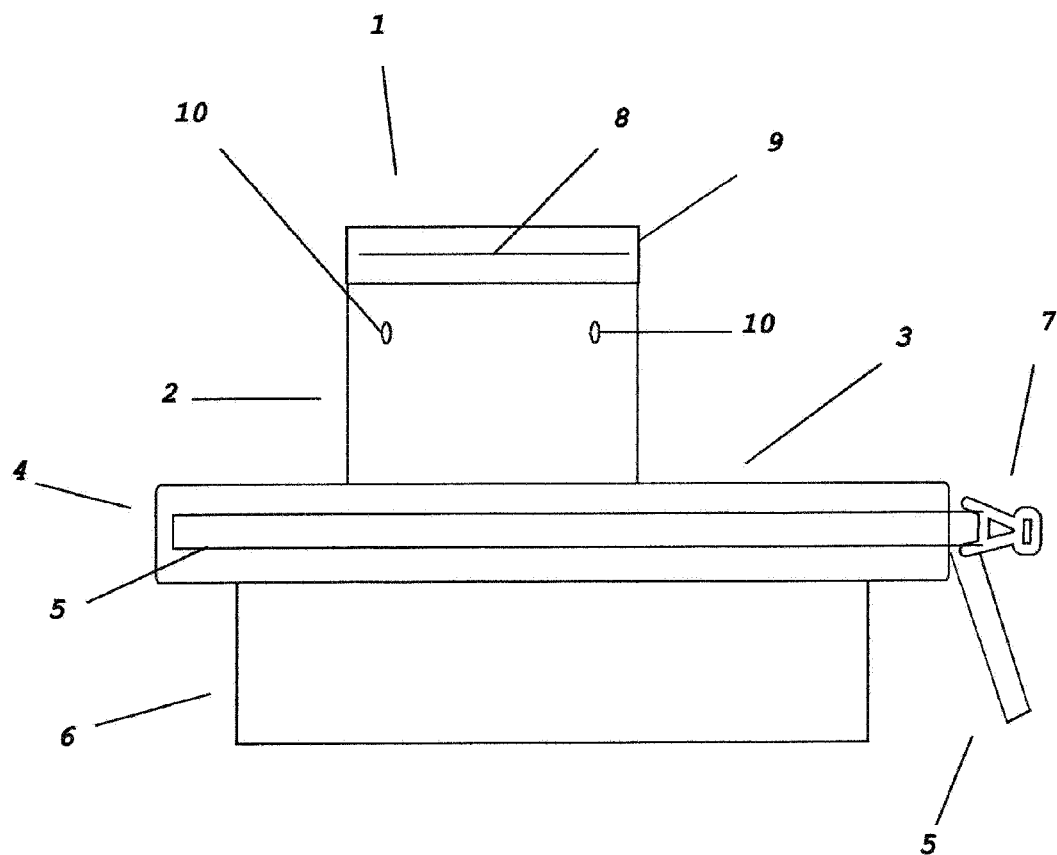

FIG. 3. Is the side view of the auger pan/hopper splash shield and safety guard.

DETAILED DESCRIPTION OF THE PREFERRED EMBODIMENT

The auger pan/hopper splash shield and safety guard 1 consists of the column 2, flare 3, lower perimeter sleeve 4, strap material 5, overflow dam/curtain 6, locking device 7, elastic material 8, upper perimeter sleeve 9, and grommets 10, as shown in FIG. 2.

As seen in FIG. 1, the auger pan/hopper splash shield and safety guard 1 sits over the top of the auger pan/hopper 13, secured by a length of strap (i.e.; rope, leather strap, or nylon webbing) 5, and a locking device 7, which in combination, act as a drawstring inside a lower perimeter sleeve 4. Toward the center, there is a column 2 with an upper perimeter sleeve 9, that gathers with elastic material 8 inside the upper perimeter sleeve 9, and affixes to the granular material source outlet 12 by flexible cords (i.e.; bungy cords), or by other attaching methods, hooked through grommets 10. (Flexible or elastic cords, or other securing devices attaching through the grommets are not shown and are not considered part of the invention.)

In FIGS. 2 and 3, along the inside edge of the lower perimeter sleeve 4 is an overflow dam/curtain 6 that hangs below the lower perimeter sleeve 4 and lines the upper interior wall of the auger pan/hopper 13, seen in FIG. 1, to prevent overflow by keeping granular material from slipping between the auger pan/hopper 13, shown in FIG. 1 and the lower perimeter sleeve 4.

During use, as illustrated in FIG. 1, the upper perimeter sleeve 9, attaches by bungy or elastic cords (not shown and not part of the invention) to the granular material source outlet 12, which is part of the granular material inflow from the auger attached to the storage bin or from a hauling vehicle. The auger outflow 11, which uploads the granular material onto the granular material hauling vehicle or storage bin, sits inside the auger pan/hopper 13, beneath the flare 3.

FIGS. 2 and 3, show different views of the invention while not in use, without the exterior devices visible. FIG. 1 shows the invention in use drawn with solid lines, while the machinery and auger pan/hopper that are not part of the invention are illustrated with dotted lines.

The drawings illustrate the basic layout of the invention, as well as how it is designed to fit to the auger pan/hopper and the granular material source outlet/auger inflow point. The actual shape, materials and size of the invention may differ according to the shape, size or model of the machines or auger pans/hoppers that are utilized during this stage of the granular material loading and unloading process.

Having fully described my invention, I claim:

1. An apparatus for unloading granular material from a storage container onto a transport vehicle, the apparatus including an outlet source by which granular material is discharged from the storage container into a pan having an open, upper end in which the granular material is deposited and an auger mechanism for moving the granular material from the pan through an auger outflow into the transport vehicle, an auger pan/hopper splash shield completely encompassing a discharge end of the outlet source through which the granular material is discharged into the pan, the open, upper end of the pan, and an inlet end of the auger outflow so as to prevent any spillage of the granular material as the granular material is conveyed between the storage container and the transport vehicle, the auger pan/hopper splash shield including:
    an upper perimeter sleeve completely encircling the discharge end of the outlet source from the storage container, the upper perimeter sleeve including an open-ended column fitting about the outlet source;
    a first attachment mechanism for securing the upper perimeter sleeve about the outlet source above the discharge end thereof;
    a lower perimeter sleeve fitting over and about the pan and completely encircling a circumference of the pan below the open, upper end of the pan and including an inlet end of the auger outflow extending into the pan, the lower perimeter sleeve including a flared section, an upper end of which is integrally formed with a lower end of the upper perimeter sleeve, and a curtain section which fits about the pan below the open, upper end of the pan so to completely encircle the pan and the inlet end of the auger outflow; and,
    a second attachment mechanism for securing the lower perimeter sleeve to the pan beneath the open, upper surface of the pan;
    whereby the auger pan/hopper splash shield prevents any granular material from being lost during conveyance thereof between the storage container to the transport vehicle.

2. The auger pan/hopper splash shield of claim 1 wherein the first attachment mechanism includes a plurality of grommets spaced apart from each other and affixed to the column of the upper perimeter sleeve adjacent an upper end of the column and at least one flexible cord extending about the outflow source with ends of the cord connected to the grommets so to secure the column of the upper perimeter sleeve to the outlet source above the discharge end of the outlet source for the upper perimeter sleeve to completely encircle the outlet source.

3. The auger pan/hopper splash shield of claim 2 wherein the second attachment mechanism includes a strap extending completely around the lower perimeter sleeve and a locking device for securing ends of the strap together for the lower perimeter sleeve to completely encircle the pan and the inlet end of the auger outflow at a location below the open, upper end of the pan, the strap and locking device acting as a drawstring.

4. The auger pan/hopper splash shield of claim 1 in which the curtain section of the lower perimeter sleeve acts as an overflow dam catching any granular material that might otherwise escape from the pan or the auger outflow.

5. The auger pan/hopper splash shield of claim 1 in which the upper perimeter sleeve and lower perimeter sleeve are of a flexible material at least partially transparent to enable a user to monitor flow of granular material between the storage container and transport vehicle.

* * * * *